US012206563B2

(12) United States Patent
Sasikumar

(10) Patent No.: US 12,206,563 B2
(45) Date of Patent: Jan. 21, 2025

(54) SYSTEMS AND METHODS FOR ASSET MAPPING FOR AN INFORMATION TECHNOLOGY INFRASTRUCTURE

(71) Applicant: Fidelity Information Services, LLC, Jacksonville, FL (US)

(72) Inventor: Aravind Sasikumar, Bengaluru (IN)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 17/930,128

(22) Filed: Sep. 7, 2022

(65) Prior Publication Data

US 2024/0022485 A1 Jan. 18, 2024

(30) Foreign Application Priority Data

Jul. 15, 2022 (IN) .............................. 202211040606

(51) Int. Cl.
*H04L 41/06* (2022.01)
*G06F 16/23* (2019.01)
*G06F 16/248* (2019.01)
*G06F 16/28* (2019.01)
*H04L 43/04* (2022.01)
*H04L 43/06* (2022.01)

(52) U.S. Cl.
CPC .......... *H04L 43/06* (2013.01); *G06F 16/2358* (2019.01); *G06F 16/2365* (2019.01); *G06F 16/248* (2019.01); *G06F 16/288* (2019.01); *H04L 43/04* (2013.01)

(58) Field of Classification Search
CPC ....... H04L 43/06; H04L 43/04; G06F 16/288; G06F 16/2358; G06F 16/2365; G06F 16/248
See application file for complete search history.

(56) References Cited

U.S. PATENT DOCUMENTS

| 9,032,070 B1 * | 5/2015 | Stickle | ................ H04L 63/1408 709/224 |
| 9,742,639 B1 * | 8/2017 | Zhang | ..................... H04L 41/12 |
| 10,505,825 B1 * | 12/2019 | Bettaiah | ................ G06F 16/285 |

(Continued)

OTHER PUBLICATIONS

International Search Report issued in International Application No. PCT/US2023/070095 dated Oct. 24, 2023 (9 pages).

*Primary Examiner* — Joseph L Greene
(74) *Attorney, Agent, or Firm* — Bookoff McAndrews, PLLC

(57) ABSTRACT

A method comprising performing, by at least one processor, operations including: sending instructions to an asset among various hardware and software assets in a networked information technology infrastructure to cause the asset to generate an answer file; copying data from the generated answer file to memory of a mapping system; tracking and logging events associated with the copying of the data; validating the copied data based on the logged events; determining standardized reporting data from the validated data in the memory of the mapping system; saving the standardized reporting data in a data structure formatted for the various hardware and software assets; applying an algorithm to the saved data structure to determine a relationship between the various hardware and software assets; and linking the determined relationship between the various hardware and software assets to the saved data structure.

20 Claims, 7 Drawing Sheets

(56) References Cited

U.S. PATENT DOCUMENTS

| | | | |
|---|---|---|---|
| 2009/0099965 A1* | 4/2009 | Grant, IV | G06Q 20/3433 |
| | | | 705/41 |
| 2010/0198914 A1* | 8/2010 | Gehrke | G06F 16/2315 |
| | | | 709/203 |
| 2021/0398235 A1* | 12/2021 | Dixit | G06F 16/254 |
| 2022/0014560 A1* | 1/2022 | Crabtree | H04L 63/1433 |
| 2022/0027331 A1 | 1/2022 | Hwang et al. | |
| 2022/0229648 A1* | 7/2022 | Rodriguez | G06F 16/213 |
| 2022/0230090 A1* | 7/2022 | Batta | G06N 20/00 |

* cited by examiner

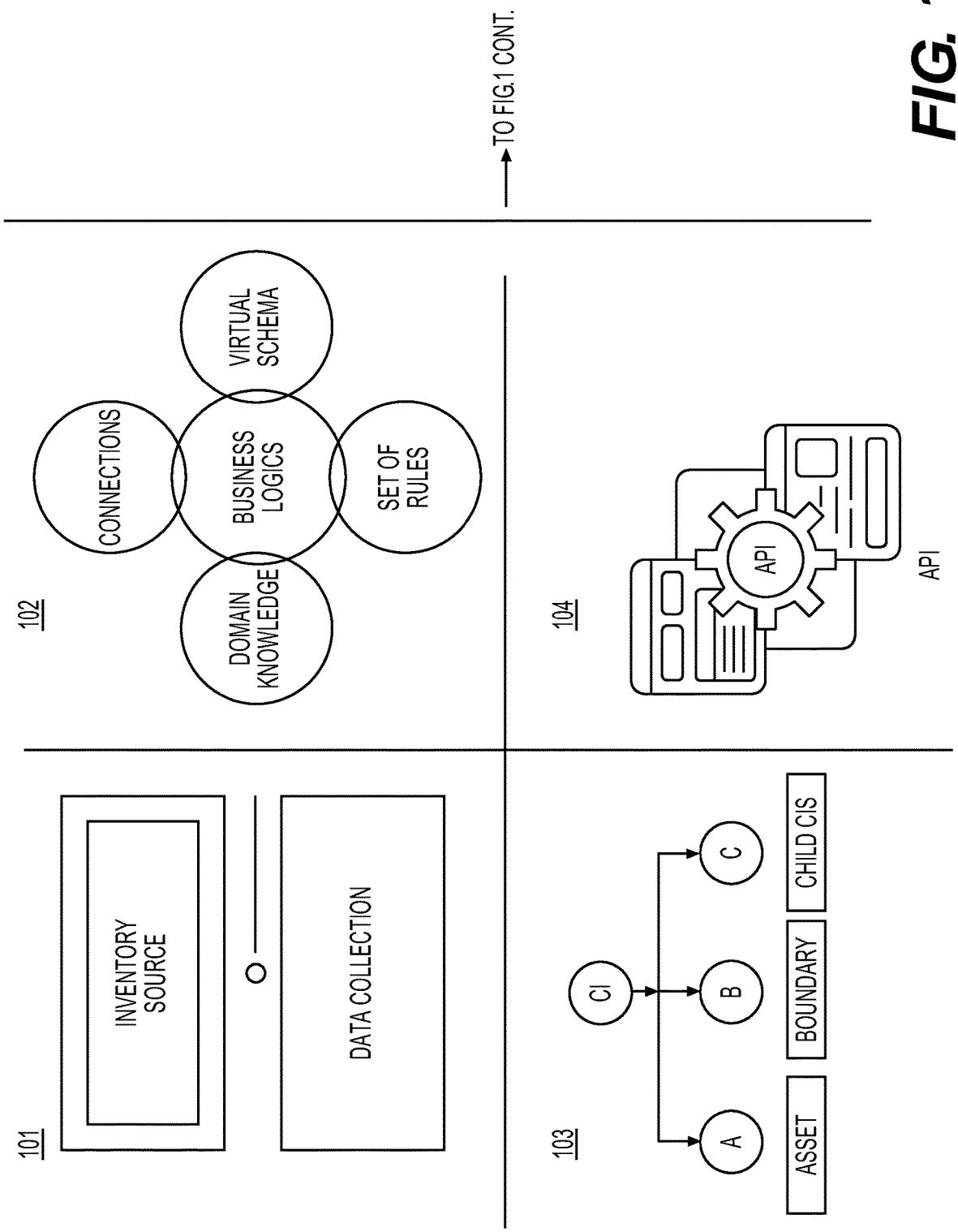

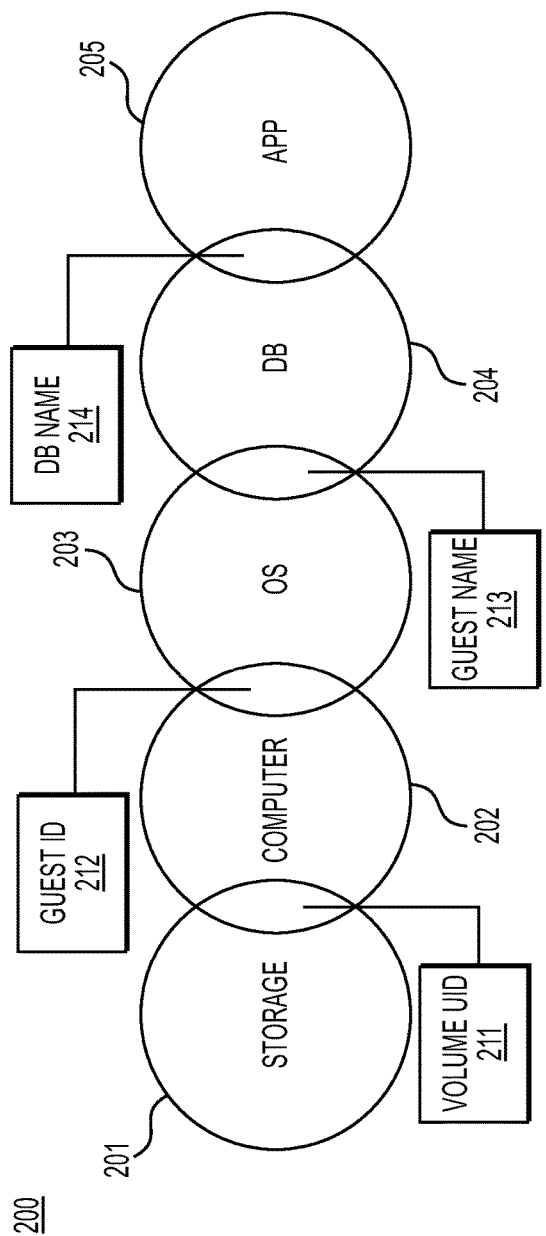

FIG. 2

| DATA CENTER | ▲LEGEND | ◆DEVICE NAME | ◆SERIAL NUMBER | ◆MODEL | ◆MANAGE-MENT TOOL | ◆IP | ◆RACK LOCATION | ◆LOGIN THROUGH | ◆USER NAME | ◆VENDER | ◆COVTRACT END DATE | ◆EDIT |
|---|---|---|---|---|---|---|---|---|---|---|---|---|
| BDOC | U4POWERMAX | BDC1WFISDCMAP01 | MXQ61501NH | TBD | FALSE | 10.237.115.252 | BF47 | NA | E ID/ ADM | HP | FALSE | EDIT |
| BDOC | FALSE | SAN-EFCM-OCDC | FALSE | TBD | FALSE | 10.20.94.236 | FALSE | FALSE | | FALSE | FALSE | EDIT |
| BDOC | COMPELLENT SC DSM PRIMARY | BDC1WFISDSMAP01 | NA | TBD | FALSE | 10.237.155.64 | NA | BDC1WFISDSMAP01 | E ID/ ADM | VMWARE | NA | EDIT |
| BDOC | COMPELLENT FS8600 DSM PRIMARY | BDC1WFISDSMAP02 | NA | TBD | FALSE | 10.237.115.170 | NA | BDC1WFISDSMAP02 | E ID/ ADM | VMWARE | NA | EDIT |

STORAGE INVENTORY
SHOW 15 ▼ ENTRIES

SEARCH RESULT FOR THE VM: LRK4WDGbtPOSQ01 410

STORAGE 420

| VOLUME | | | |
|---|---|---|---|
| STORAGE NAME | STORAGE POOL | VOLUME NAME | ALLO |
| LTCMPLNT1 | LOW PRIORITY (TIER 3) | LTC_CL2_CORE7-75834-T3-0004 | 8.00 |

421

VIRTUAL MACHINES 440

| INFO | DISKS | | |
|---|---|---|---|
| VM NAME | POWER STATE | GUEST STATE | HEARTBEAT |
| LRK4WDGBTPOSQ01 | POWERED ON | RUNNING | GREEN |

441

COMPUTER 430

| DATASTORES | ESX |
|---|---|
| DS NAME | NAA.ID |
| LTC_CL2_CORE7-75834-T3-0004 | NAA.6000D31001283A00000000000000004E68 |

431

DATABASES 450

| DB NAME | DISKS | |
|---|---|---|
| SERVER NAME | DB | NAME |
| LRK4WDGBTPOSQ01 | alerts_hosted_tm_sit | alerts |
| LRK4WDGBTPOSQ01 | alerts_hosted_tm_sit | alerts_log |
| LRK4WDGBTPOSQ01 | alerts_OKTA_TM_SIT | alerts |
| LRK4WDGBTPOSQ01 | alerts_OKTA_TM_SIT | alerts_log |

SYSTEMS AND METHODS FOR ASSET MAPPING FOR AN INFORMATION TECHNOLOGY INFRASTRUCTURE

CROSS-REFERENCE TO RELATED APPLICATION(S)

This application claims the benefit of priority under 35 U.S.C. § 119 from Indian Patent Application No. 202211040606, filed on Jul. 15, 2022 in the Indian Patent Office, the entire contents of which is incorporated herein by reference.

TECHNICAL FIELD

Various embodiments of the present disclosure relate generally to an automated framework to correlate infrastructure components.

BACKGROUND

A networked information technology infrastructure may contain numerous assets. An asset may refer to a hardware product or component, or to a software program or configuration. Currently available products do not provide a centralized asset management and mapping tool for global infrastructure operations that provides health and readiness of assets, asset-to-asset relationships, asset issue tracking, and asset incident and configuration change history. Accordingly, management of the assets and operations continues to be difficult. Currently available products do not provide a look up table or reference chart to find an impact or "blast radius" of a configuration item when a problem with the asset occurs. As used herein, a "blast radius" may refer to a way of measuring a total impact of a potential problem with an asset. The present disclosure is directed to overcoming one or more of the aforementioned limitations of what is known to date.

SUMMARY OF THE DISCLOSURE

In some aspects, the techniques described herein relate to a method including: performing, by at least one processor, operations including: sending instructions to an asset among various hardware and software assets in a networked information technology infrastructure to cause the asset to generate an answer file; copying data from the generated answer file to memory of a mapping system; tracking and logging events associated with the copying of the data; validating the copied data based on the logged events; determining standardized reporting data from the validated data in the memory of the mapping system; saving the standardized reporting data in a data structure formatted for the various hardware and software assets; applying an algorithm to the saved data structure to determine a relationship between the various hardware and software assets; and linking the determined relationship between the various hardware and software assets to the saved data structure.

In some aspects, the techniques described herein relate to a method, wherein the operations further include: receiving a query regarding the determined relationship; and displaying the saved data structure with the determined relationship between the various hardware and software assets in a user interface.

In some aspects, the techniques described herein relate to a method, wherein the operations further include: receiving a query regarding the determined relationship; and sending the saved data structure with the determined relationship between the various hardware and software assets to an external application.

In some aspects, the techniques described herein relate to a method, wherein the asset includes one or more of a storage asset, a computer asset, and operating system asset, a database asset, or an application asset.

In some aspects, the techniques described herein relate to a method, wherein the determined relationship includes one or more of a storage asset linked to a computer asset via a volume unique identifier, a computer asset linked to an operating system asset via a guest identifier, an operating system asset linked to a database asset via a guest name, or a database asset linked to an application asset via a database name.

In some aspects, the techniques described herein relate to a method, wherein the operations further include: prompting members of an approval group to validate a change to the saved data structure.

In some aspects, the techniques described herein relate to a method, wherein the operations further include: determining a capacity of each of a plurality of servers in the mapping system to collect information from the various hardware and software assets; and sending the instructions to the asset based on the determined capacity of each server.

In some aspects, the techniques described herein relate to a method, wherein the generated answer file includes one or more of volume properties of a storage asset, virtual machine information of a computer asset, virtual disk information of a computer asset, physical storage information of a computer asset, guest server information of a database asset, database size information of a database asset, database name information of a database asset, or database disk association of a database asset.

In some aspects, the techniques described herein relate to a method, wherein the determined relationship includes a local field name for the determined relationship based on a foreign field name from the generated answer file from the asset.

In some aspects, the techniques described herein relate to a method, wherein the operations further include: receiving a query regarding the determined relationship via a Uniform Resource Locator; and sending the saved data structure with the determined relationship between the various hardware and software assets to an external application via JavaScript Object Notation.

In some aspects, the techniques described herein relate to a system to determine a relationship between various hardware and software assets in a networked information technology infrastructure, the system including: a memory to store instructions; and at least one processor to execute the stored instructions to perform a method including: sending instructions to an asset among various hardware and software assets in a networked information technology infrastructure to cause the asset to generate an answer file; copying data from the generated answer file to memory of the mapping system; tracking and logging events associated with the copying of the data; validating the copied data based on the logged events; determining standardized reporting data from the validated data in the memory of the mapping system; saving the standardized reporting data in a data structure formatted for the various hardware and software assets; applying an algorithm to the saved data structure to determine a relationship between the various hardware and software assets; and linking the determined relationship between the various hardware and software assets to the saved data structure.

In some aspects, the techniques described herein relate to a system, wherein the method further includes: receiving a query regarding the determined relationship; and displaying the saved data structure with the determined relationship between the various hardware and software assets in a user interface.

In some aspects, the techniques described herein relate to a system, wherein the method further includes: receiving a query regarding the determined relationship; and sending the saved data structure with the determined relationship between the various hardware and software assets to an external application.

In some aspects, the techniques described herein relate to a system, wherein the asset includes one or more of a storage asset, a computer asset, and operating system asset, a database asset, or an application asset.

In some aspects, the techniques described herein relate to a system, wherein the determined relationship includes one or more of a storage asset linked to a computer asset via a volume unique identifier, a computer asset linked to an operating system asset via a guest identifier, an operating system asset linked to a database asset via a guest name, or a database asset linked to an application asset via a database name.

In some aspects, the techniques described herein relate to a system, wherein the method further includes: prompting members of an approval group to validate a change to the saved data structure.

In some aspects, the techniques described herein relate to a system, wherein the method further includes: determining a capacity of each of a plurality of servers in the mapping system to collect information from the various hardware and software assets; and sending the instructions to the asset based on the determined capacity of each server.

In some aspects, the techniques described herein relate to a system, wherein the generated answer file includes one or more of volume properties of a storage asset, virtual machine information of a computer asset, virtual disk information of a computer asset, physical storage information of a computer asset, guest server information of a database asset, database size information of a database asset, database name information of a database asset, or database disk association of a database asset.

In some aspects, the techniques described herein relate to a system, wherein the determined relationship includes a local field name for the determined relationship based on a foreign field name from the generated answer file from the asset.

In some aspects, the techniques described herein relate to a non-transitory computer readable medium storing instructions that, when executed by at least one processor, cause the at least one processor to perform a method including: sending instructions to an asset among various hardware and software assets in a networked information technology infrastructure to cause the asset to generate an answer file; copying data from the generated answer file to memory of a mapping system; tracking and logging events associated with the copying of the data; validating the copied data based on the logged events; determining standardized reporting data from the validated data in the memory of the mapping system; saving the standardized reporting data in a data structure formatted for the various hardware and software assets; applying an algorithm to the saved data structure to determine a relationship between the various hardware and software assets; and linking the determined relationship between the various hardware and software assets to the saved data structure.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts an example asset linking diagram, according to one or more embodiments.

FIG. 3 depicts an example storage inventory user interface, according to one or more embodiments.

FIG. 4 depicts another example user interface, according to one or more embodiments.

DETAILED DESCRIPTION OF EMBODIMENTS

Figure 1:
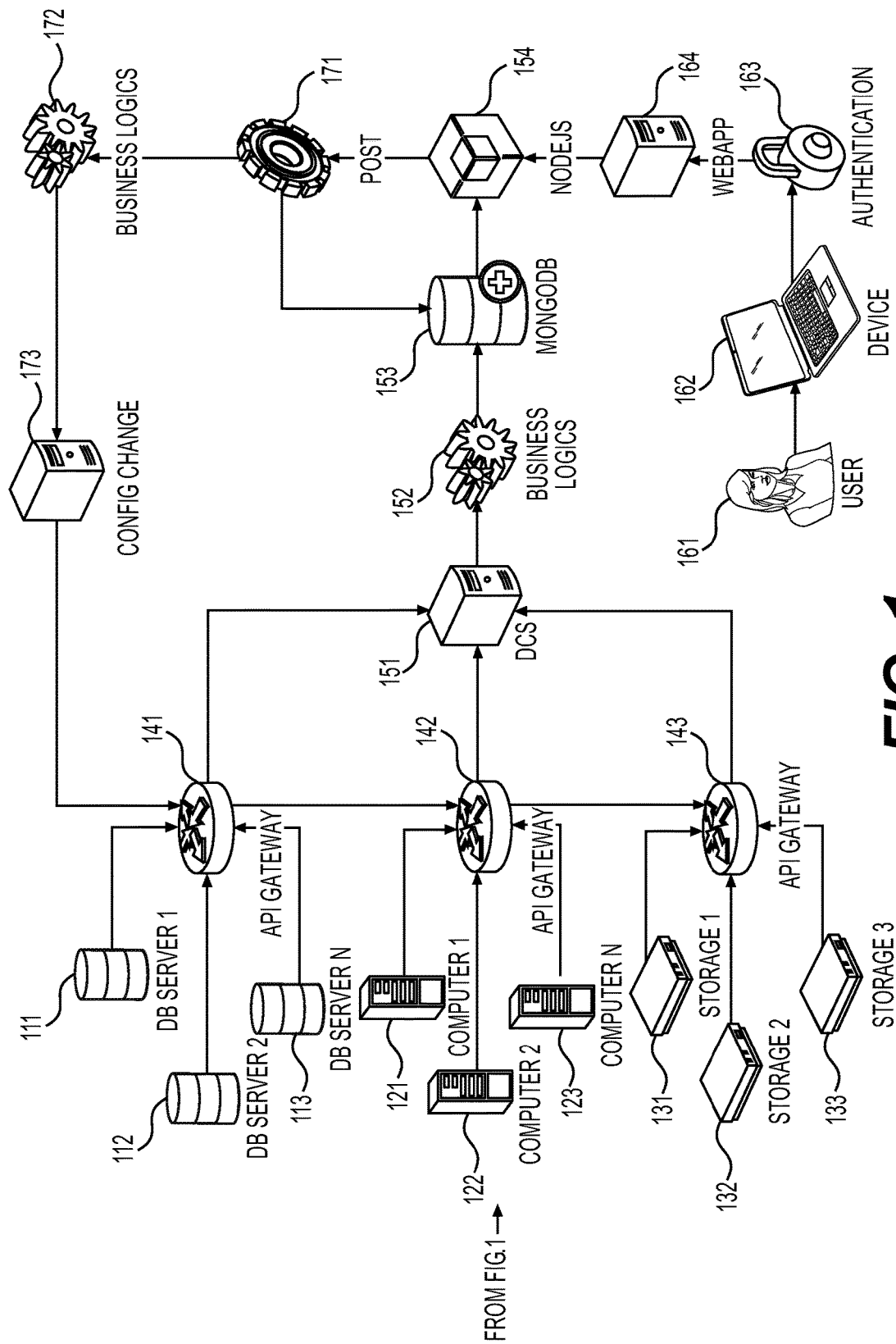
FIG. 1 depicts a block diagram of an example system for mapping relationships between assets in a networked information technology infrastructure, according to one or more embodiments.

The following embodiments describe an automated framework to correlate infrastructure components, and, more particularly, to systems and methods for mapping a relationship between hardware and software assets in a networked information technology infrastructure.

A networked information technology infrastructure may contain numerous assets. An asset may refer to a hardware product or component, or to a software program or configuration. Currently available products do not provide a centralized asset management and mapping tool for global infrastructure operations that provides health and readiness of assets, asset-to-asset relationships, asset issue tracking, and asset incident and configuration change history. Accordingly, management of the assets and operations continues to be difficult. Currently available products do not provide a look up table or reference chart to find a blast radius of a configuration item when a problem with the asset occurs. Again, a blast radius may refer to a way of measuring a total impact of a potential problem with an asset.

Creating a functional configuration management database is a challenge for many companies, and organizations often invest heavily in an underlying infrastructure, professional services, and licenses. These projects are long term in nature and are rarely able to meet all the demands of an organization. Organizations may have complex tables that are difficult to maintain and to navigate.

Furthermore, when an application team identifies an issue, different infrastructure management teams may be used to investigate the issue. Some information from one team may be dependent on the findings of another team. This information dependency frequently leads to delays in addressing the issue. Also, an incorrect configuration item may be identified, which prohibits an efficient investigation, and often results in an overall delay in resolution of the issue.

In addition, information from different data sources, such as from a database or storage network, for example, may be fed into a centralized repository for artificial intelligence and/or machine learning algorithms, as the information from the different data sources may be raw. Therefore, processing data in the centralized repository may become complex for large amounts of information, and management of centralized repository may become unsustainable and expensive.

The present disclosure is directed to overcoming one or more of these above-referenced challenges.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description.

Various non-limiting embodiments of the present disclosure will now be described to provide an overall understanding of the principles of the structure, function, and use of the systems and methods disclosed herein.

One or more examples of these non-limiting embodiments are illustrated in the selected examples disclosed and described in detail with reference to the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The following embodiments describe an asset and/or inventory information storing framework that may store multi-vendor product information procured by a company.

The following embodiments may include data collection agents to capture information related to a child converged infrastructure generated by assets. Such information for a computer asset may include, for example, virtual servers, storage, network, CPU, and memory. Such information for a database asset may include, for example, a databases name, storage, and server of residence. Such information for a storage asset may include, for example, created volumes, storage pools, server mapping, and sharing.

Assets may be linked to other assets by various data. For example, a storage asset may be linked to a computer asset via a volume unique identifier. A computer asset may be linked to an operating system asset via a guest identifier. An operating system asset may be linked to a database asset via a guest name. A database asset may be linked to an application asset via a database name.

The following embodiments may include a correlation engine to map and transform asset information to standard labels to import data from two different data sources. For example, computer and storage assets may be linked using a unique volume identification. Database assets may be structures with various database platforms across various network-attached storage assets. The assets may be linked in a child converged infrastructure and populate a configuration management database.

The following embodiments may include components to transform the configuration management database including the child converged infrastructure with linked assets into a searchable web application. The web application may provide an interface to display and search the child converged infrastructure with linked assets.

FIG. 1 depicts a block diagram of an example system for mapping relationships between assets in a networked information technology infrastructure, according to one or more embodiments.

The system 100 for mapping relationships between assets in a networked information technology infrastructure may include various components, including inventory source and data collection 101, business logic 102, asset relationship links 103, and Application Programming Interfaces 104. Inventory source and data collection 101 may include hardware and software assets and raw data collected from the assets. Business logic 102 may include connections between assets, virtual schema, rules for mapping assets, and domain knowledge. Asset relationship links 103 may include assets, boundaries, and child converged infrastructure provided to link assets together. Application Programming Interfaces (API) 104 may include various tools to retrieve and display information related to the assets and relationships.

The system 100 for mapping relationships between assets in a networked information technology infrastructure may include various components. For example, system 100 may include database server 111, database server 112, and database server 113 connected to API gateway 141. System 100 may include computer 121, computer 122, and computer 123 connected to API gateway 142. System 100 may include storage 131, storage 132, and storage 133 connected to API gateway 143. Database server 111, database server 112, database server 113, computer 121, computer 122, computer 123, storage 131, storage 132, and storage 133 may be example assets of a networked information technology infrastructure.

API gateway 141, API gateway 142, and API gateway 143 may be connected to Data Collection Script (DCS) 151. DCS 151 may collect data from one or more of database server 111, database server 112, database server 113, computer 121, computer 122, computer 123, storage 131, storage 132, or storage 133 through API gateway 141, API gateway 142, or API gateway 143. DCS 151 may be connected to business logic 152. Business logics 152 may be connected to database 153. Database 153 may be connected to network node 154. Network node 154 may be connected to HTTP node 171. HTTP node 171 may be connected to database 153 and to business logic 172. Business logics 172 may be connected to configuration change server 173. Configuration change server 173 may be connected to API gateway 141, API gateway 142, and API gateway 143. User 161 may access system 100 through device 162 via authenticator 163 and web application 164. Web application 164 may be connected to network node 154.

Web application 164 may include features such as watchtowers, overwatch sentinels, auxiliaries, and mecha. The watchtowers may be technology-specific and provide tailored web applications for reporting. The overwatch sentinels may provide capabilities to email custom reports and custom alerts specific to an issue. The auxiliaries may support contracts, data center locations, downstream message routers, racks, access routes, standard operating procedures (SOPs), etc. The mecha may provide automated bots or programs for self-healing and Business as Usual (BAU) operations, such as provisioning.

System 100 may use an application programming interface (API) call, for example, to an asset to retrieve asset-format data and convert the retrieved asset-format data into standard-format data. The standard-format data may be displayed on a user interface, such as web application 164, providing an overview of a plurality of assets. Additionally, from the web application 164, a user 161 may change a configuration of an asset through configuration change server 173.

The instructions for the DCS 151 may be implemented in PowerShell and/or Python, for example. The instructions for the business logic 152 and 172 may be implemented in open source code including Papa Parse, C3.js, and/or jQuery, for example. The instructions for the web application 164 may be implemented using HTML, CSS, JavaScript, and/or NODE.js, for example. However, the above examples are merely provided for illustration, and the disclosure is not limited to the above implementations.

Business logic 152 may include features such as data visualization, analytics, bounty dashboards, risk boards, and Artificial Intelligence for Information Technology Operations (AIOPS), which may be implemented with PowerShell and NODE.js using data from Comma Separated Values (CSV) and MongoDB, for example.

DCS 151 may include features such as vendor developed and supported APIs, Software Development Kits (SDKs), and other toolkits. DCS 151 may further provide data collection, structuring, and post script capabilities. Additionally, DCS 151 may provide AIOPS based on storage management standards. DCS 151 may be deployed for any type of system, such as a server, an operating system, or a storage device, for example. DCS 151 may be a script or collection of scripts to log in to a system if necessary and collect one more properties of the system. For example, DCS 151 may collect data related to system storage space utilization. DCS 151 may also include a log to track event errors, successes, and/or failures for code audits and enhancements.

Business logic 152 may provide business profiles for data enrichment. A script or collection of scripts may read the data from DCS 151, and convert the read data from DCS 151 to information using logic bound to a Line of Business (LOB), such as interacting with web application 164. Business logic 152 may use structured data saved to a database, or saved as a Comma Separated Values (CSV) file for the web application 164.

Web application 164 may provide information such as device capacity, hardware health, performance, bounty dashboards, and Service Level Agreements (SLA) meters in a readily viewable form. The web application 164 may provide a collection of tools and code to interpret data from the business logic 152 in tabular and/or graphical form.

DCS 151 may be considered to be a data harvester from assets. Scripts of any programming language configured to implement certain application programming interface (API) operations, such as "get" and "put" operations, may be placed in a server. Data collection may be scheduled as needed depending on the urgency of the data. Because the data is inter-related, the data may be used for many different types of analyses. The system is platform independent so that components may be independently developed and implemented, as long as the output of the components follow a common architecture.

Structuring the data may include collecting data from assets using, e.g., API calls, and formatting the collected data to a tabular format with standard header names. The output may be created as a file and saved in a database 153. The system may include additional automation to validate the collected data prior to usage. Business specific data transformation may be applied, and the collected data may be enriched. The information may be visualized using a web application 164. The implementation results may be captured for audits and other business workflows.

DCS 151 may use a get operation to collect data from multiple assets. The collected data may be centralized, validated, and saved to a database 153, and converted to a webpage for display in web application 164. DCS 151 may also use a put operation to generate an answer file based on a workflow addition in a ticketing tool, where data is converted as needed, and saved to a file to change a configuration of an asset using configuration change server 173. Additionally, the answer file may link the ticketing tool to the system 100, where parameters from the workflow addition and data collection may be separately validated for execution.

Data from each assets may include, for example, MasterClass: {type: String, Required: true, default: 'Storage'}, DC: {type: String, required: false, default: false}, StorageType: {type: String, required: false, default: false}, DeviceName: {type: String, required: false, default: false, unique:true}, NodeName: {type: String, required: false, default: false}, SerialNumber: {type: String, required: false, default: false}, IP: {type: String, required: false, default: false}, VIP: {type: String, required: false, default: false}, ENV: {type: String, required: false, default: false}, State: {type: String, required: false, default: false}, IsMaster: {type: String, required: false, default: false}, Manufacturer: {type: String, required: false, default: false}, Vendor: {type: String, required: false, default: false}, Model: {type: String, required: false, default: false}, ContractEndDate: {type: String, required: false, default: false}, ManagementTool: {type: String, required: false, default: false}, RackLocation: {type: String, required: false, default: false}, LoginThrough: {type: String, required: false, default: false}, UserName: {type: String, required: false, default: "NA"}, Legend: {type: String, required: false, default: false}, BU: {type: String, required: false, default: false}, DataManagerGroup: {type: String, required: false, default: false}, DataApprovalGroup: {type: String, required: false, default: false}, SupportGroup: {type: String, required: false, default: false}, ChangeManagementGroup: {type: String, required: false, default: "Change Management—Global"}, DCAddress: {type: String, required: false, default: false}, LastUpdated: {type: Date, required: false, default: Date.now}, LastUpdatedBy: {type: String, required: false, default: "System"}, IsAnAsset: {type:String, required: false, default: "No"}, and AssetTag: {type: String, required: false, default: false}.

FIG. 2 depicts an example asset linking diagram 200, according to one or more embodiments.

Assets may be linked to other assets by various data. For example, a storage asset 201 may be linked to a computer asset 202 via a volume unique identifier 211. A computer asset 202 may be linked to an operating system asset 203 via a guest identifier 212. An operating system asset 203 may be linked to a database asset 204 via a guest name 213. A database asset 204 may be linked to an application asset 205 via a database name 214.

Linking assets may be performed by a correlation engine. In the correlation engine, data from different sources may be tagged appropriately, using primary attribute "Device Name", for example, which may exist in inventory data, child converged infrastructure, and boundary converged infrastructure. Assets may be linked using a primary relation, application binding, ticketing records, network records, or backup records, for example. A primary relation may use the boundary data to create a correlation between assets. In application binding, the application information is captured using hash tags or comment sections of the child converged infrastructure. For ticketing records, an incident change or problem record of a device (virtual or physical) may be related using the converged infrastructure item name. Network records may use the network property of the devices (attributes related to network) to relate all upstream and downstream connections to an asset. Backup records may be used for computer assets.

FIG. 3 depicts an example storage inventory user interface, according to one or more embodiments.

Storage inventory user interface 300 may include data 310. Data 310 may include information retrieved from various assets in a networked information technology infrastructure. Data 310 may include, for example, a device name, serial number, IP address, physical location, network location, user name, or vendor. Data 310 may be editable in the storage inventory user interface 300.

FIG. 4 depicts an example user interface, according to one or more embodiments.

User interface 400 may include mapping data for an asset. Mapping data may include information linking various assets in a networked information technology infrastructure. For example, as illustrated in FIG. 4, a virtual machine 410 may be linked to storage assets 420, computer assets 430, virtual machine assets 440, and database assets 450. Storage assets 420 may include information related to volume 421, computer assets 430 may include information related to differentiated services 431, virtual machine assets 440 may include information related to virtual machine 441, and database assets 450 may include information related to databases 451.

Figure 5:
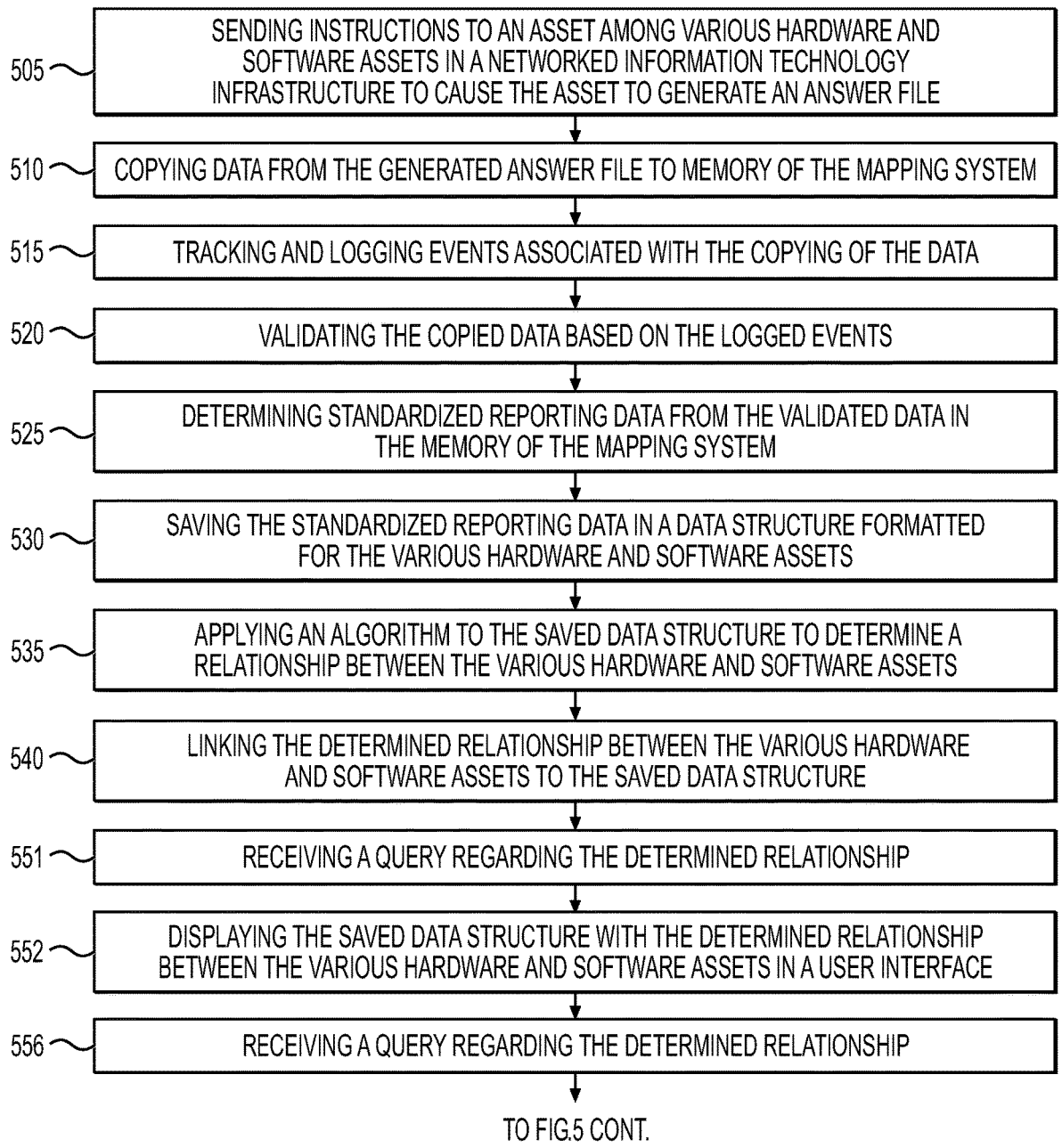
FIG. 5 depicts a flow diagram illustrating an example process logic flow or method of mapping relationships between assets in a networked information technology infrastructure, according to one or more embodiments.
Figure 5:
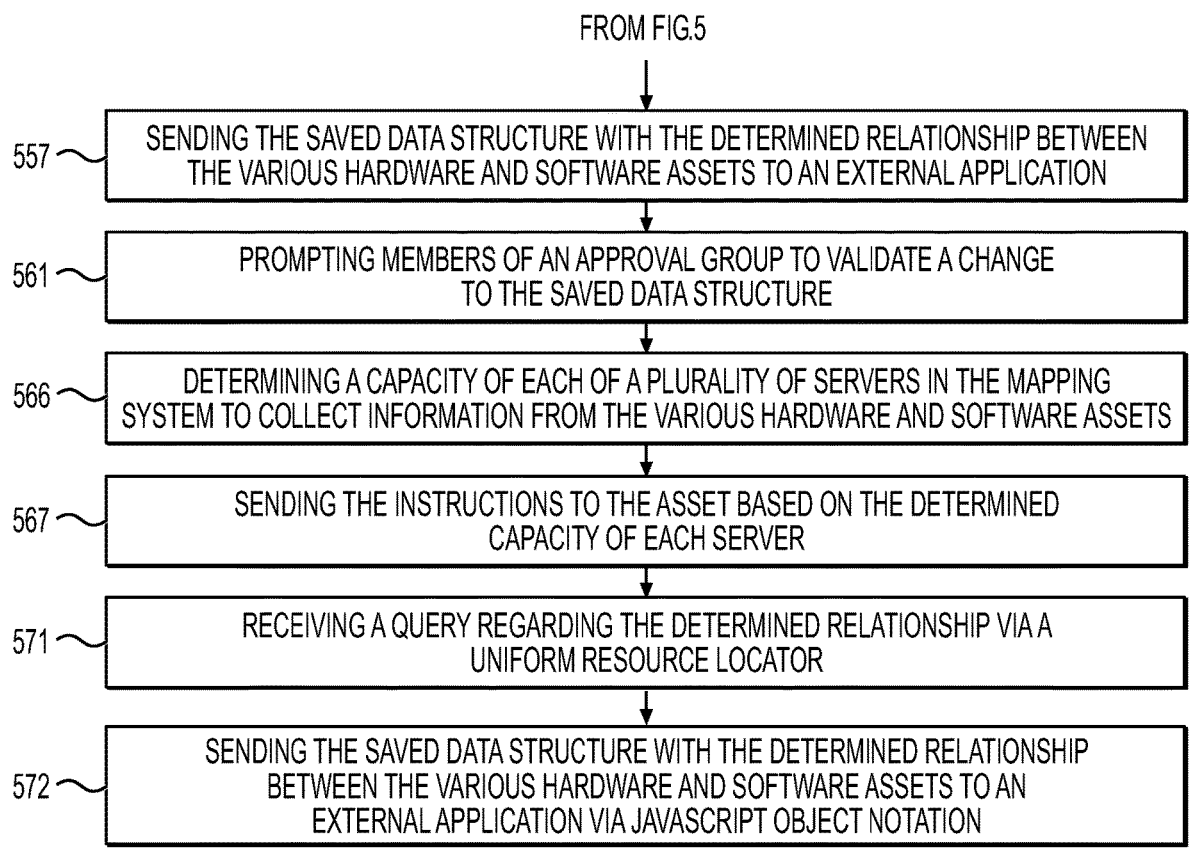

FIG. 5 depicts a block diagram illustrating an example process logic flow for mapping relationships between assets in a networked information technology infrastructure, according to one or more embodiments.

Method 500 may include performing, by at least one processor 602 of a mapping system 100, various operations. The various operations may include sending instructions to an asset among various hardware and software assets in a networked information technology infrastructure to cause the asset to generate an answer file (operation 505). The various operations may include copying data from the generated answer file to memory 604 of the mapping system 100 (operation 510). The various operations may include tracking and logging events associated with the copying of the data (operation 515). The various operations may include validating the copied data based on the logged events (operation 520). The various operations may include determining standardized reporting data from the validated data in the memory 604 of the mapping system 100 (operation 525). The various operations may include saving the standardized reporting data in a data structure formatted for the various hardware and software assets (operation 530). The various operations may include applying an algorithm to the saved data structure to determine a relationship between the various hardware and software assets (operation 535). The various operations may include linking the determined relationship between the various hardware and software assets to the saved data structure (operation 540).

The various operations may include receiving a query regarding the determined relationship (operation 551), and displaying the saved data structure with the determined relationship between the various hardware and software assets in a user interface (operation 552). The various operations may include receiving a query regarding the determined relationship (operation 556), and sending the saved data structure with the determined relationship between the various hardware and software assets to an external application (operation 557). The asset may include one or more of a storage asset, a computer asset, and operating system asset, a database asset, or an application asset. The determined relationship may include one or more of a storage asset linked to a computer asset via a volume unique identifier, a computer asset linked to an operating system asset via a guest identifier, an operating system asset linked to a database asset via a guest name, or a database asset linked to an application asset via a database name. The various operations may include prompting members of an approval group to validate a change to the saved data structure (operation 561). The various operations may include determining a capacity of each of a plurality of servers in the mapping system to collect information from the various hardware and software assets (operation 566), and sending the instructions to the asset based on the determined capacity of each server (operation 567).

The generated answer file may include one or more of volume properties of a storage asset, virtual machine information of a computer asset, virtual disk information of a computer asset, physical storage information of a computer asset, guest server information of a database asset, database size information of a database asset, database name information of a database asset, or database disk association of a database asset. The determined relationship may include a local field name for the determined relationship based on a foreign field name from the generated answer file from the asset.

The various operations may include receiving a query regarding the determined relationship via a Uniform Resource Locator (operation 571), and sending the saved data structure with the determined relationship between the various hardware and software assets to an external application via JavaScript Object Notation (operation 572).

DCS 151 may use a script to log into an asset and generate an asset answer file as a volatile or non-volatile instance. DCS 151 may use an API to collect data from the generated answer file to volatile or non-volatile memory. DCS 151 may track collection events (with error or success) and log the events to a ticketing tool (not shown) for audit. DCS 151 may validate the collected data using the logged events. Business logic 152 may read the validated data from volatile memory, may determine standard reporting data from the read asset data, and may save the standardized data in a formatted structure for the assets in database 153. Web application 164 may display saved data in a graphical user interface (e.g., Web UI) in response to user queries to the database 153.

Web application 164 may display the standard format data in a variety of group configurations. For example, the standard format data may be displayed as separate web interfaces for different geographical areas or networks.

In one or more embodiments, a user may input a requested configuration change for a vendor storage device into a ticketing tool. Configuration change server 173 may use an asset API to log into an asset using a user name and password. The configuration change server 173 may transform the requested configuration change from the ticketing tool into an asset specific format, and update the asset using the configuration change in the asset specific format. The configuration change server 173 may query the asset to determine whether the configuration was successfully applied, and log the configuration change. The configuration change server 173 may provide a message to the ticketing tool indicating the requested configuration change was successfully applied.

Assets have different ways of interpreting similar data, which may confuse system administrators and/or delay responses when handling different assets. By using data standardization, system administrators and others may more easily read the data and take appropriate actions. Data collection may be performed using API or Secure Shell Protocol (SSH), for example. Collected data may be formatted in such a way that the data representing an asset specific term is converted to an Industry standard form. LOB thresholds may be applied on the data for analytics, the information may be enriched and validated, and execution logs may be captured. The final data may be converted to CSV UTF-8 format, for example, and saved locally for general access by a web application 164. The data may be used for replication data and/or snapshot interpretations. The standardized data may be visualized into charts, where a violation of LOB rules may be highlighted for operational stability. The standardized data may be used during implementation for go/no-go scenarios to avoid issues related to assets.

The techniques disclosed in the present disclosure result in technical improvements by providing a centralized asset management and mapping tool for global infrastructure operations that provides health and readiness of assets, asset-to-asset relationships, asset issue tracking, and asset incident and configuration change history. Accordingly, mapping of the assets and operations is improved. The techniques disclosed in the present disclosure provide a look up table or reference chart to find a blast radius of a configuration item when a problem with the asset occurs.

The techniques disclosed in the present disclosure creating a functional configuration management database so that organizations do not need to invest heavily in an underlying infrastructure, professional services, and licenses. The techniques disclosed in the present disclosure allow integrated infrastructure management teams to investigate an issue, which reduces delays in addressing the issue. The techniques disclosed in the present disclosure identify correct configuration items, which provides an efficient investigation, and reduces overall delays in resolution of the issue.

The techniques disclosed in the present disclosure feed information from different data sources, such as from a database or storage network, for example, into a centralized repository for Artificial Intelligence and/or Machine Learning algorithms with a standardized format. Therefore, the complexity of processing data in the centralized repository is reduced for large amounts of information, and management of centralized repository is sustainable and less expensive.

Figure 6:
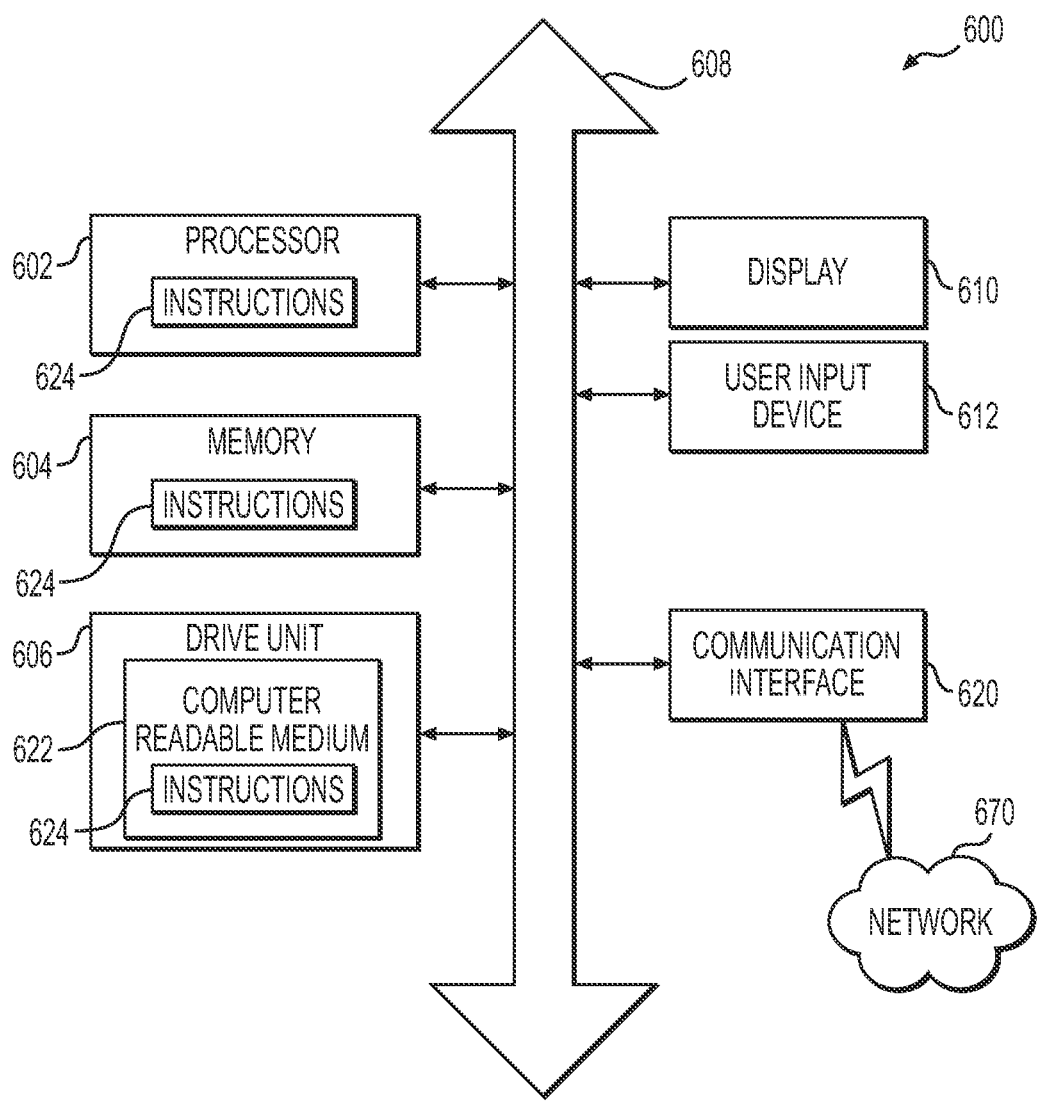
FIG. 6 illustrates an implementation of a general computer system that may execute techniques presented herein, according to one or more embodiments.

FIG. 6 illustrates an implementation of a general computer system that may execute techniques presented herein.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 6 illustrates an implementation of a computer system 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while a computer system 600 is illustrated as a single system, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of computer system 600. The input device 612 may be a number pad, a keyboard, or a cursor control device, such as a mouse, or a joystick, touch screen display, remote control, or any other device operative to interact with the computer system 600.

The computer system 600 may also or alternatively include drive unit 606 implemented as a disk or optical drive. The drive unit 606 may include a computer-readable medium 622 in which one or more sets of instructions 624, e.g. software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 670 can communicate voice, video, audio, images, or any other data over the network 670. Further, the instructions 624 may be transmitted or received over the network 670 via a communication port or interface 620, and/or using a bus 608. The communication port or interface 620 may be a part of the processor 602 or may be a separate component. The communication port or interface 620 may be created in software or may be a physical connection in hardware. The communication port or interface 620 may be configured to connect with a network 670, external media, the display 610, or any other components in computer system 600, or combinations thereof. The connection with the network 670 may be a physical connection, such as a wired Ethernet connection or may be established wirelessly as discussed below. Likewise, the additional connections with other components of the computer system 600 may be physical connections or may be established wirelessly. The network 670 may alternatively be directly connected to a bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to a network 670. The network 670 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 670 may include wide area networks (WAN), such as the Internet, local area networks (LAN), campus area networks, metropolitan area networks, a direct connection such as through a Universal Serial Bus (USB) port, or any other networks that may allow for data communication. The network 670 may be configured to couple one computing device to another computing device to enable communication of data between the devices. The network 670 may generally be enabled to employ any form of machine-readable media for communicating information from one device to another. The network 670 may include communication methods by which information may travel between computing devices. The network 670 may be divided into sub-networks. The sub-networks may allow access to all of the other components connected thereto or the sub-networks may restrict access between the components. The network 670 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems may be made and used. A number of modifications, including substitutions of systems between or among examples and variations among combinations may be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc., are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc., may be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically may be grouped together to perform a function or group of related functions. Like reference numerals are generally intended to refer to the same or similar components. Components and modules may be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein may be applied to, or easily modified for use with, other types of equipment, may use other arrangements of computing systems such as client-server distributed systems, and may use other protocols, or operate at other layers in communication protocol stacks, than are described.

It is intended that the specification and examples be considered as exemplary only, with a true scope and spirit of the disclosure being indicated by the following claims.

What is claimed is:

1. A method comprising:
performing, by at least one processor, operations including:
sending instructions to an asset among various hardware and software assets in a networked information technology infrastructure to cause the asset to generate an answer file;

copying data from the generated answer file to memory of a mapping system;
tracking and logging events associated with the copying of the data, wherein the logging includes logging an error or success of the copying the data from the generated answer file to the memory of the mapping system;
validating the copied data based on the logged events, wherein the copied data is validated based on the logged successful copying;
determining standardized reporting data from the validated data in the memory of the mapping system;
saving the standardized reporting data in a data structure formatted for the various hardware and software assets;
applying an algorithm to the saved data structure to determine a relationship between the various hardware and software assets; and
linking, using reference to one or more converged infrastructure item names in a workflow addition ticketing record including an incident or problem record of the various hardware and software assets, the determined relationship between the various hardware and software assets to the saved data structure.

2. The method of claim 1, wherein the operations further comprise:
receiving a query regarding the determined relationship; and
displaying the saved data structure with the determined relationship between the various hardware and software assets in a user interface.

3. The method of claim 1, wherein the operations further comprise:
receiving a query regarding the determined relationship; and
sending the saved data structure with the determined relationship between the various hardware and software assets to an external application.

4. The method of claim 1, wherein the asset includes one or more of a storage asset, a computer asset, and operating system asset, a database asset, or an application asset.

5. The method of claim 1, wherein the determined relationship includes one or more of a storage asset linked to a computer asset via a volume unique identifier, a computer asset linked to an operating system asset via a guest identifier, an operating system asset linked to a database asset via a guest name, or a database asset linked to an application asset via a database name.

6. The method of claim 1, wherein the operations further comprise:
prompting members of an approval group to validate a change to the saved data structure.

7. The method of claim 1, wherein the operations further comprise:
determining a capacity of each of a plurality of servers in the mapping system to collect information from the various hardware and software assets; and
sending the instructions to the asset based on the determined capacity of each server.

8. The method of claim 1, wherein the generated answer file includes one or more of volume properties of a storage asset, virtual machine information of a computer asset, virtual disk information of a computer asset, physical storage information of a computer asset, guest server information of a database asset, database size information of a database asset, database name information of a database asset, or database disk association of a database asset.

9. The method of claim 1, wherein the determined relationship includes a first field name for the determined relationship based on a second field name from the generated answer file from the asset.

10. The method of claim 1, wherein the operations further comprise:
receiving a query regarding the determined relationship via a Uniform Resource Locator; and
sending the saved data structure with the determined relationship between the various hardware and software assets to an external application via JavaScript Object Notation.

11. A system to determine a relationship between various hardware and software assets in a networked information technology infrastructure, the system comprising:
a memory to store instructions; and
at least one processor to execute the stored instructions to perform a method including:
sending instructions to an asset among various hardware and software assets in a networked information technology infrastructure to cause the asset to generate an answer file;
copying data from the generated answer file to memory of a mapping system;
tracking and logging events associated with the copying of the data, wherein the logging includes logging an error or success of the copying the data from the generated answer file to the memory of the mapping system;
validating the copied data based on the logged events, wherein the copied data is validated based on the logged successful copying;
determining standardized reporting data from the validated data in the memory of the mapping system;
saving the standardized reporting data in a data structure formatted for the various hardware and software assets;
applying an algorithm to the saved data structure to determine a relationship between the various hardware and software assets; and
linking, using reference to one or more converged infrastructure item names in a workflow addition ticketing record including an incident or problem record of the various hardware and software assets, the determined relationship between the various hardware and software assets to the saved data structure.

12. The system of claim 11, wherein the method further comprises:
receiving a query regarding the determined relationship; and
displaying the saved data structure with the determined relationship between the various hardware and software assets in a user interface.

13. The system of claim 11, wherein the method further comprises:
receiving a query regarding the determined relationship; and
sending the saved data structure with the determined relationship between the various hardware and software assets to an external application.

14. The system of claim 11, wherein the asset includes one or more of a storage asset, a computer asset, and operating system asset, a database asset, or an application asset.

15. The system of claim 11, wherein the determined relationship includes one or more of a storage asset linked to a computer asset via a volume unique identifier, a computer asset linked to an operating system asset via a guest identifier, an operating system asset linked to a database asset via a guest name, or a database asset linked to an application asset via a database name.

16. The system of claim 11, wherein the method further comprises:
prompting members of an approval group to validate a change to the saved data structure.

17. The system of claim 11, wherein the method further comprises:
determining a capacity of each of a plurality of servers in the mapping system to collect information from the various hardware and software assets; and
sending the instructions to the asset based on the determined capacity of each server.

18. The system of claim 11, wherein the generated answer file includes one or more of volume properties of a storage asset, virtual machine information of a computer asset, virtual disk information of a computer asset, physical storage information of a computer asset, guest server information of a database asset, database size information of a database asset, database name information of a database asset, or database disk association of a database asset.

19. The system of claim 11, wherein the determined relationship includes a first field name for the determined relationship based on a second field name from the generated answer file from the asset.

20. A non-transitory computer readable medium storing instructions that, when executed by at least one processor, cause the at least one processor to perform a method comprising:
sending instructions to an asset among various hardware and software assets in a networked information technology infrastructure to cause the asset to generate an answer file;
copying data from the generated answer file to memory of a mapping system;
tracking and logging events associated with the copying of the data, wherein the logging includes logging an error or success of the copying the data from the generated answer file to the memory of the mapping system;
validating the copied data based on the logged events, wherein the copied data is validated based on the logged successful copying;
determining standardized reporting data from the validated data in the memory of the mapping system;
saving the standardized reporting data in a data structure formatted for the various hardware and software assets;
applying an algorithm to the saved data structure to determine a relationship between the various hardware and software assets; and
linking, using reference to one or more converged infrastructure item names in a workflow addition ticketing record including an incident change or problem record of the various hardware and software assets, the determined relationship between the various hardware and software assets to the saved data structure.

* * * * *